April 15, 1969   L. A. HERÉDY ET AL   3,438,722
REMOVAL OF SULFUR OXIDES FROM FLUE GAS
Filed May 15, 1967
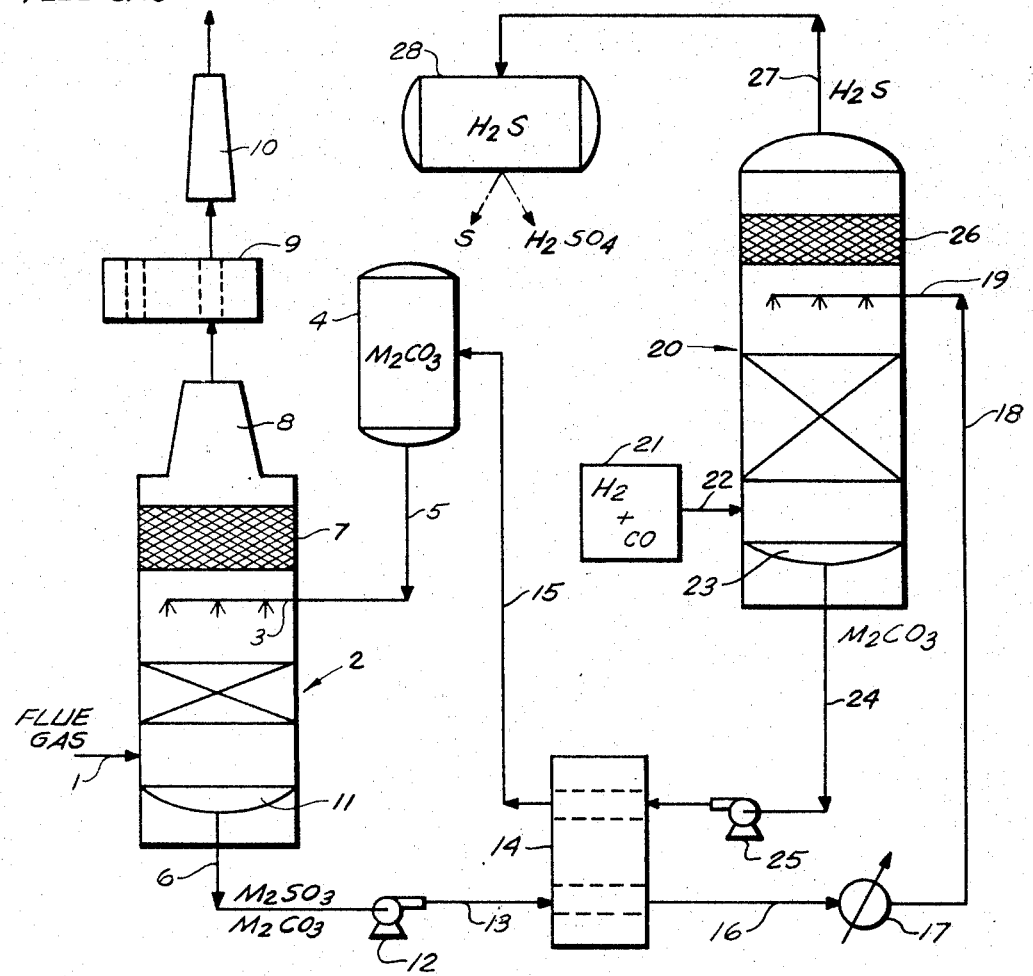
INVENTORS.
LASZLO A. HERÉDY
DONALD E. McKENZIE
SAMUEL J. YOSIM
Henry Kolin
ATTORNEY

United States Patent Office 3,438,722
Patented Apr. 15, 1969

3,438,722
REMOVAL OF SULFUR OXIDES FROM FLUE GAS
Laszlo A. Herédy, Canoga Park, and Donald E.
McKenzie and Samuel J. Yosim, Woodland Hills,
Calif., assignors to North American Rockwell
Corporation
Filed May 15, 1967, Ser. No. 638,528
Int. Cl. B01d 47/02; C01b 17/16
U.S. Cl. 23—2                                                7 Claims

ABSTRACT OF THE DISCLOSURE

A method for removing sulfur dioxide from flue gas by absorption of the sulfur dioxide in a molten alkali metal carbonate mixture. The absorbent is preferably regenerated and commercial sulfur values recovered as hydrogen sulfide by a single-stage treatment of the resultant absorbent solution with a gaseous mixture containing hydrogen and either carbon monoxide or carbon dioxide.

Cross references to related applications

Various regeneration processes that may be utilized for treatment of the resultant absorbent solution provided by the present invention are described in the following patent applications, all filed May 15, 1967 and assigned to the assignee of the present invention: "Two-Stage Regeneration of Absorbent for Sulfur Oxides" Ser. No. 638,529, "Absorbent Regenerations Using Carbon Regenerant" Ser. No. 638,365, "Sulfur Production Using Carbon Oxide Regenerant" Ser. No. 638,530, "Sulfur Production Using Carbon Regenerant" Ser. No. 638,366, and "Electrochemical Method for Recovery of Sulfur Oxides" Ser. No. 638,364.

Background of the invention

This invention relates to a process for the removal of sulfur compounds from hot combustion gases. It particularly relates to a process wherein the sulfur dioxide content of a flue gas is removed by absorption in a molten alkali metal carbonate-containing solution, and the absorbent is regenerated and the sulfur values recovered from the resultant absorbent solution.

Sulfur oxides, principally as sulfur dioxide, are present in the waste gases discharged from many metal refining and chemical plants and in the flue gases from power plants generating electricity by the combustion of fossil fuels. The control of air pollution resulting from this discharge of sulfur oxides into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which they contain make removal of the sulfur compounds from these gases expensive. Also, while the possible byproducts, such as elemental sulfur and sulfuric acid, that may be ultimately obtained from the recoverable sulfur values have virtually unlimited markets as basic raw materials, they sell for relatively low figures. Consequently, low-cost recovery processes are required.

Many processes have been proposed and investigated for the desulfurization of flue gases. In a typical wet absorption process, the flue gas is washed with an alkaline aqueous solution or slurry. Thus the use of an aqueous slurry of calcium hydroxide or calcium carbonate has been investigated in several British power plants. In other wet processes, aqueous ammonia or aqueous sodium sulfite solutions have been utilized as washing fluids. While these wet processes have some advantageous features, they all suffer from the common drawback of the flue gas being cooled substantially and becoming saturated with water vapor in the absorption tower. This cooling of the gas decreases the overall efficiency of the process because of the additional power requirements for dispersal of the flue gas to the atmosphere. Further, the associated condensation and precipitation of evaporated water containing contaminants in the surrounding environment creates substantial problems.

In the dry processes using solid adsorbents, sulfur dioxide is removed either by chemical reaction with the adsorbent or by adsorption followed by oxidation of the adsorbed sulfur dioxide. In one such process, shown in U.S. Patent 2,718,453, finely powdered calcium carbonate is blown into the combustion gas to form calcium sulfate or calcium sulfite. In general, a reaction between a solid and gas is relatively slow and inefficient, being limited to the available surface area of the solid. Also, the resultant products do not readily lend themselves to regeneration of the starting carbonate material or recovery of the removed sulfur values.

In a regenerative dry process, the flue gas is contacted with activated lignite char at about 200° C., sulfur dioxide being adsorbed and converted immediately by the oxygen and water present in the flue gas to sulfuric acid. The char is regenerated by heating at about 400° C. to yield a desorbed gas of high sulfur dioxide content. In another dry process, pellets of alkalized alumina are used as adsorbent to remove sulfur dioxide. Undesirably, this adsorbed material is oxidized to sodium sulfate by the catalytic action of the alkalized alumina. The saturated adsorbent is regenerated by heating it at 600° C. with a reducing gas. The solid adsorbent processes are disadvantageous in being surface area limited and further because of the difficulties involved in the handling and moving of large quantities of the solid adsorbent which would be required in large-scale process applications.

In a catalytic oxidation process, sulfur dioxide is converted to sulfur trioxide at a temperature of about 400–430° C. by catalytic oxidation using alumina-supported platinum or vanadia catalysts, followed by hydration to sulfuric acid. While the concept of direct oxidation is potentially attractive, very extensive prior purification of the flue gas is required to avoid poisoning of the catalyst and contamination of the produced sulfuric acid. Also, the resultant 70 weight percent sulfuric acid produced in such a process is very corrosive at the condensation temperature involved, and therefore requires the use of very large and expensive corrosion-resistant equipment. Further, sulfuric acid of this concentration has a very limited market.

Summary of the invention

It is an object of the present invention to provide a highly efficient method for the removal of sulfur dioxide and sulfur trioxide from flue gases using inexpensive, readily available materials and avoiding the use of expensive equipment. At the same time, this process further provides means for both regenerating the absorbent and recovering sulfur values readily convertible to sulfur or sulfuric acid as marketable products.

In accordance with this invention, sulfur oxides present in a hot combustion gas generally produced by burning a sulfur-containing hydrocarbon fuel are removed from the combustion gas by contacting the gas at a temperature of at least 350° C. with a molten salt mixture containing alkali metal carbonates as active absorbent to thereby remove the sulfur oxides. The melting temperature of the salt mixture is preferably between 350 and 450° C. It is a further feature of this invention that the absorbent is regenerated by treatment of the resultant molten absorbent solution containing the absorbed sulfur values at a temperature between 400 and 650° C., preferably 500 and 600° C., with a gaseous mixture containing hydrogen and either carbon monoxide or carbon dioxide or mixtures thereof while at the same time the sulfur values are recovered from this solution. Both the absorption and regeneration steps are preferably performed at atmospheric pressure, thereby simplifying equipment requirements and costs.

In a preferred aspect of practicing this invention, the combustion gas is treated with a molten ternary salt mixture of the carbonates of lithium, sodium, and potassium, molten at 400° C., to convert the $SO_2$ present to alkali metal sulfite according to the following equation:

$$M_2CO_3 + SO_2 \rightarrow M_2SO_3 + CO_2$$

where M denotes a ternary mixture of Li, Na, K, excess $M_2CO_3$ molten salt being used as carrier solvent. Suitably, this preferred reaction is performed at a temperature between 395 and 600° C. and particularly between 400 and 450° C., approximately corresponding to the temperature of a typical power plant flue gas. The molten product of reaction consisting of alkali metal sulfite dissolved in molten alkali metal carbonate and optionally containing a fused-salt diluent is treated with a gaseous mixture preferably containing hydrogen and carbon monoxide, preferably water gas or producer gas, at a temperature between 400 and 650° C., preferably between 500 and 600° C. The mixed alkali metal carbonates are regenerated and at the same time hydrogen sulfide is formed, essentially in accordance with the following equations:

$$M_2SO_3 + 2CO + H_2 \rightarrow M_2CO_3 + H_2S + CO_2$$
$$M_2SO_3 + CO + 2H_2 \rightarrow M_2CO_3 + H_2S + H_2O$$
$$2M_2SO_3 + 3CO + 3H_2 \rightarrow 2M_2CO_3 + 2H_2S + CO_2 + H_2O$$

Where the reactant gas mixture consists of hydrogen and carbon dioxide, the following reaction occurs:

$$M_2SO_3 + CO_2 + 3H_2 \rightarrow M_2CO_3 + H_2S + 2H_2O$$

A portion of the carbon dioxide may be converted to carbon monoxide by reaction with hydrogen. Commercial processes are known and available for utilizing the obtained hydrogen sulfide as a suitable feedstock for a sulfuric acid plant or for production of elemental sulfur.

Brief description of the drawing

The sole figure of the drawing shows a schematic flow diagram illustrating the absorption and regeneration steps of a preferred embodiment of the invention for the treatment of hot combustion gases obtained by the burning of a sulfur-containing fossil fuel in an electric generating plant.

Description of the preferred embodiments

In the broadest aspects of this invention, any hot combustion gas having a sulfur oxide content may be effectively contacted with a molten salt mixture containing alkali metal carbonates as reactive absorbent. Sulfur dioxide present in the gas will be converted to alkali metal sulfite, and sulfur trioxide present will be converted to alkali metal sulfate. Where purification of the combustion gas by elimination of its sulfur oxide content is the essential consideration, the present process is of particular utility in this regard whether or not the absorption step is followed by a regeneration step wherein the alkali metal carbonate is regenerated and hydrogen sulfide is recovered. Where only the absorption step is contemplated, the fused salt melt may contain the active alkali metal carbonates as only a minor component thereof, the other components of the melt serving as inexpensive diluents which may also be employed to lower the melting temperature of the alkali metal carbonate mixture where this is desired. Also, for certain regeneration processes, it may be desirable during the absorption step to control the amount of alkali metal carbonate present as a minor component of the fused salt melt so that there is complete conversion of alkali metal carbonate to alkali metal sulfite.

However, because of the present requirements for an effective, economical process for the elimination of air pollution caused by the emission of sulfur oxides into the atmosphere, the present invention will be particularly illustrated with respect to the removal of sulfur oxides from hot combustion gases obtained by the burning of sulfur-containing fossil fuels, particularly in electric generating plants. In these plants, the combustion of a ton of an average coal containing 3.4% sulfur typically yields about 400,000 standard cubic feet of stack gases that contain 3000 p.p.m. sulfur dioxide and 30 p.p.m. sulfur trioxide by volume, i.e., a sulfur dioxide content of less than 0.5 vol. percent. Consequently, the economic and efficient removal of the small sulfur dioxide content compared with the larger flue gas volume, before discharge of the sulfur dioxide into the atmosphere, is a difficult one. Further, the ultimate disposal of the removed sulfur dioxide, preferably by regeneration of the absorbent used and conversion of the absorbed sulfur values to utilizable byproducts, also requires solution.

Referring to the drawing, a flue gas obtained from the combustion of a sulfur-containing coal and at a temperature of about 425±25° C. is admitted by way of a conduit 1 to an absorber unit 2. For a typical 1000 mw.(e.) coal-fired electric utility plant utilizing coal containing 3 wt. percent sulfur, about 4,650,000 cu. ft./min. flue gas with an $SO_2$ content of about 0.18 vol. percent is generated. The flue gas is passed through a fly ash precipitator (not shown) to remove fine particles entrained therein, prior to entry into the absorber. For a 1000 mw.(e.) plant, absorber unit 2 ordinarily consists of five stainless steel cyclone spray towers in parallel arrangement. These towers are suitably insulated with about 5 inches of high temperature insulation so that the temperature drop within them is less than five degrees centigrade.

The flue gas enters tangentially at the base of absorber 2 and travels upwardly with a velocity of about 20 ft./sec. It is contacted countercurrently by a spray of molten carbonate (M.P. about 400° C.) which is discharged through a spray distributor 3 located about 15 ft. above the base of the absorber tower. The molten carbonate salt is contained in a storage vessel 4, which is suitably insulated and equipped with heaters so as to maintain the carbonate salt in a molten state. The molten salt leaves vessel 4 by way of a conduit 5 connected to spray distributor 3 at a flow rate adjusted to provide about 10–30 mole percent sulfite content in the effluent molten salt stream leaving the bottom of absorber 2 by way of a conduit 6.

Because of the rapidity of the chemical reaction between the molten carbonate and the gaseous sulfur dioxide to form alkali metal sulfite, a gas residence time of less than a second is sufficient for a spray height of 15 feet. In addition to the chemical reaction requirements, the flow rate of the flue gas is also determined by the need for minimizing entrainment and pressure drop in the absorber as well as by the spray distribution pattern of the molten carbonate. Any of various well-known contact methods and equipment may be used to insure rapid reaction between the gaseous sulfur dioxide and the molten liquid carbonate such as use of wet-wall contactors or packed columns, or absorbers containing perforated plates or bubble-cap trays. However, the spray technique is generally preferred because of its relative simplicity and efficiency.

After contacting the molten carbonate spray, the desulfurized flue gas flows past distributor 3 into a wire demister 7, which is about 1 foot thick and located in the upper section of the absorber tower about two feet above the distributor. The demister serves to remove entrained salt-containing droplets from the flue gas, which is then passed through a conical transition section 8 to minimize pressure drops in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10. Conventional power plant stacks are 400 to 800 feet high so that mixing in the atmosphere will considerably reduce the ground level concentration of the sulfur dioxide ordinarily present in the emitted stack gases. Since the present process is capable of eliminating 99.9 vol. percent of the sulfur dioxide content of the flue gas, the resultant ground level concentration of sulfur dioxide under ideal conditions is virtually nonexistent, i.e., less than 1 part per billion.

The molten mixture of alkali metal carbonates in vessel 4 serves as the active absorbent of the present invention. Where the melt consists essentially of only the alkali metal carbonates, a ternary mixture consisting of potassium carbonate, lithium carbonate, and sodium carbonate is utilized having a melting point between 400 and 600° C. While the individual melting points of the three carbonates fall within the range of 725 to 900° C., a mixture containing approximately equal amounts by weight of the carbonates of potassium, lithium, and sodium has a melting point of about 395° C., about that of the eutectic composition.

Data for the free energy of reaction between $SO_2$ and $M_2CO_3$ to form $M_2SO_3$ show that thermodynamically this reaction is favored at lower temperatures. Therefore, the absorption of $SO_2$ is preferably carried out at temperatures as close to the melting point of the mixed carbonate eutectic as is feasible from plant operating considerations. Further, in order to minimize equipment corrosion and economize on fuel costs, it is additionally preferred to utilized a molten carbonate-containing mixture having as low a melting point as feasible.

The ternary alkali metal carbonate system has been described by G. J. Janz and M. R. Lorenz in J. Chem. Eng. Data 6,321 (1961). As described therein, the alkali metal carbonate eutectic melts at 397±1° C. and consists of 43.5, 31.5, and 25.0 mole percent of the carbonates of lithium, sodium, and potassium, respectively. Since the low melting region around the eutectic temperature is quite broad, a relatively large variation in composition (±5 mole percent) does not change the melting point markedly. Thus, a suitable ternary eutectic composition range, in mole percent, consists of 45±5 lithium carbonate, 30±5 sodium carbonate, and 25±5 potassium carbonate.

Other nonreactive molten salts may be combined with the alkali metal carbonates to serve as inexpensive diluents or to lower the temperature. For example, lithium-potassium salt mixture containing chloride, sulfits, and carbonate is molten at a temperature of 325° C. Where such diluent salts are utilized, either a single alkali metal carbonate or a binary or ternary mixture of the alkali metal carbonates is combined therewith, the final mixture containing two or more alkali metal cations. In such a system as little as 2 mole percent of alkali metal carbonate may be present with the remaining 98 mole percent being an inert diluent carrier, although at least 5–10 mole percent of alkali metal carbonate is preferable. Illustrative of such a suitable mixture is one utilizing a LiCl-KCl eutectic (M.P. 348° C.) wherein the starting salt ratio consists of 64.8 mole percent LiCl and 35.2 mole percent KCl. An absorbent molten mixture containing 90 mole percent of the LiCl-KCl eutectic and 10 mole percent of a corresponding molar ratio of potassium and lithium carbonates has a melting point of about 375° C. Suitable chloride-carbonate molten salt mixtures useful in the practice of this invention contain, in mole percent, 15–60 $K^+$, 40–85 $Li^+$, and 0–20 $Na^+$ as cations and 10–98 $Cl^-$ and 2–90 $CO_3^=$ as anions.

Although the melting points of the pure alkali metal sulfites and sulfides are considerably higher than those of the mixed alkali metal carbonates, it has further been discovered that if a sulfite or sulfide is substituted for only a portion of the carbonate the melting point is lowered, thereby making feasible the circulation of sulfite-containing carbonate melt without the need for additional heat input to keep the circulated salt molten, which would be required were sulfite obtained alone as the reaction product. An alkali metal sulfite content of 10–30 mole percent of the molten salt is preferred.

The molten sulfite-containing carbonate resulting from the rapid reaction between molten carbonate spray and the flue gas is collected in a dished-bottom heated sump 11 of absorber 2. About a 70 mole percent excess of unreacted carbonate is maintained to serve as a solvent for the sulfite formed by the reaction. The sulfite-carbonate mixture is pumped from sump 11 of absorber 2 through conduit 6 by way of a pump 12, then through a conduit 13 to a heat exchanger 14. The sulfite-carbonate mixture entering heat exchanger 14 is at a temperature of about 425±25° C. Its temperature is increased in the heat exchanger and at the same time the temperature of regenerated molten carbonate feed stock being returned to storage vessel 4 by way of a conduit 15 is lowered. The sulfite-carbonate mixture leaves heat exchanger 14 by way of a conduit 16 and passes through a heater 17, which is optionally utilized for further increasing the temperature of the mixture, where required, to about 550±50° C. The mixture leaves heater 17 through a conduit 18 where it is fed into a spray distributor 19 in a regenerator unit 20. Other gas-liquid contact techniques, similar to those usable for absorber unit 2, may also be used for the regeneration reaction.

The over-all chemical reaction in the regenerator unit involves concurrent reduction of the alkali metal sulfite to hydrogen sulfide and regeneration of alkali metal carbonate by treatment of the alkali metal sulfite-carbonate melt with a gaseous mixture containing hydrogen and carbon monoxide or carbon dioxide in accordance with any combination of the following exemplary equations:

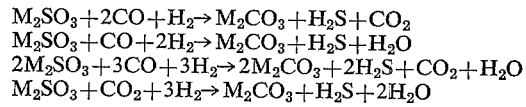

while $H_2S$ will be obtained in all cases from the reduction of the alkali metal sulfite, either carbon dioxide or water or both will be additionally obtained depending upon the relative proportions of the hydrogen and carbon oxides in the regenerant gas mixture. While the exact mechanism of regeneration is but imperfectly understood, it is believed, without intending to be limited by this explanation, that alkali metal sulfide may be formed as an intermediate reaction product. However, this compound, if formed, should be converted during the course of the reaction to carbonate and hydrogen sulfide by the gaseous products formed during the reaction, depending upon reaction conditions in the regenerator. High contact efficiency between the gaseous and liquid phases and prolonged times of contact, as well as temperature optimization favor the above reactions to the detriment of competing reactions or formation or accumulation of intermediate products.

The regenerant gaseous mixture of hydrogen and carbon monoxide or carbon dioxide or mixtures thereof may be obtained by mixing the two or three pure gases in desired proportions. Or a gaseous mixture may be prepared in situ in the regenerator by feeding in a mixture of hydrogen and carbon dioxide, a portion of the carbon dioxide then being reduced to carbon monoxide by reaction with hydrogen. Or steam and carbon monoxide may be used as a reactant gaseous mixture, at least a portion thereof being converted to hydrogen and carbon dioxide, the unconverted CO serving as principal reductant. However, from the point of view of process economics, the gaseous mixture utilized is ordinarily obtained from a synthesis gas plant as a water gas, producer gas, coal gas, or carburetted water gas. A representative water gas or blue gas obtained by the decomposition of steam in the presence of an incandescent carbon source, such as bituminous coal or coke, typically contains 40% CO, 48% $H_2$, 5% $CO_2$, 6% $N_2$, and 1% $CH_4$, by volume. A representative producer gas obtained by the partial combustion of a carbonaceous fuel in air contains 25–35% CO, 10–15% $H_2$, 3–7% $CO_2$, balance $N_2$, by volume. Preferably, the water gas or producer gas utilized is provided by a synthesis gas plant adjunct capable of delivering ash-free gas for the regenerator unit.

Referring to the drawing, a regenerant gas mixture containing hydrogen and carbon monoxide provided by a synthesis gas plant 21 enters the base of regenerator 20 by way of a conduit 22. The molten sulfite-carbonate mixture sprayed from distributor 19 reacts with the regenerant gas which is present in about 15% excess. The molten alkali metal carbonate, including both regenerated and carrier carbonate, is collected in a sump 23 at the base of regenerator 20, from where it is fed by way of a conduit 24 by means of a pump 25 to heat exchanger 14, where it loses heat, and then is returned to storage vessel 4 by way of conduit 15. The reconverted carbonate is then recycled to absorber 2 by way of conduit 5.

The hydrogen sulfide-rich gas mixture produced in the regeneration reaction also contains minor amounts of COS, S, $CO_2$, $H_2O$, and excess reducing gas. This gas mixture passes through a demister 26, which removes entrained liquid particles, and leaves regenerator 20 by way of a conduit 27 where it is fed to a processing plant 28, schematically shown as a hydrogen sulfide storage vessel.

To obtain sulfuric acid, the hydrogen sulfide-rich gas is oxidized to $SO_2$, which is then catalytically converted to $SO_3$ by a chamber process or contact process, the $SO_3$ being then absorbed in 98–99 wt. percent sulfuric acid. Alternatively, the $H_2S$-rich mixture is fed to a Claus reactor for conversion to elemental sulfur. The hydrogen sulfide feedstock provided by the present process is ideally suitable for conversion to sulfuric acid or to sulfur on an industrial scale by the foregoing well-known techniques. The selection of the final product, i.e., sulfuric acid or sulfur, will be determined generally by economic and marketing considerations.

The following examples illustrate the practice of the invention but are not intended to unduly limit the generally broad scope of the present invention.

EXAMPLE 1

$SO_2$ absorption from flue gas

Several series of experiments were performed evaluating the pick-up of $SO_2$ by a molten mixture of alkali metal carbonates in which the $SO_2$ content of the gas mixture, the gas flow rates, and the reaction temperatures were varied.

In one series of runs the feed gas consisted of $CO_2$ containing 0.1 to 20 vol. percent $SO_2$. The molten carbonate melt consisted of a ternary mixture of the carbonates of lithium, sodium, and potassium of approximately eutectic composition and was maintained at a temperature of about 500° C. The flow of $SO_2$ through the melt was varied from 1.5 to 24 ml./min. These flow rates provided a very short contact time between gas and melt since the gas inlet bubbler was about ¼-inch in diameter and was located about 1 inch below the liquid level. The inlet gas was preheated to about 400° C. before contacting the melt.

The final concentration of resultant alkali metal sulfite in molten carbonate varied from about 10 to 19.1 mole percent sulfite for feed gases having an initial concentration ranging from 1 to 18.2 vol. percent $SO_2$. Material balance analyses based on wet chemical analysis and gas chromatographic analysis together with continuous monitoring of the off flue gas showed that more than 99.9% of the $SO_2$ content was removed from the simulated flue gas.

In another series of runs the effect of using a lower reaction temperature was evaluated, other experimental conditions being essentially similar to those described above. The temperature of the ternary molten salt mixture was maintained below 425° C., and the inlet gas was not preheated prior to contacting the melt. Analysis showed that more than 99% of the $SO_2$ was removed from the simulated flue gas.

The effect upon $SO_2$ absorption of an increasing concentration of alkali metal sulfite in the ternary eutectic alkali metal carbonate melt was also evaluated. It was found that removal of the $SO_2$ from the flue gas proceeded nearly quantitatively even after more than 30% of the alkali metal carbonate had been converted to alkali metal sulfite.

EXAMPLE 2

Absorption of $SO_2$ by melts containing fractional carbonate concentrations

A reciprocal salt system was prepared by mixing 40 grams of an LiCl-KCl eutectic (58 mole percent LiCl, 42 mole percent KCl, M.P. 348° C.) with 10 grams $Li_2CO_3$ and 5.34 grams KCl. The material was premelted in air and appeared to transform into a viscous glass at a temperature between 350 and 375° C. The analysis of the melt composition was as follows:

INITIAL MELT COMPOSITION

| Substance | Grams | Wt. percent | Cationic or anionic, mole percent |
| --- | --- | --- | --- |
| Li+ | 4.76 | 8.8 | 65.6 |
| K+ | 14.02 | 25.8 | 34.3 |
| Cl- | 27.44 | 50.5 | 85.1 |
| $CO_3^=$ | 8.13 | 15.0 | 14.9 |

Pure $SO_2$ was used as the feed gas, the flow rate being varied from 9 to 14 ml./min. This feed gas was bubbled through about 1½–2 in. of the melt which was maintained in a quartz tube immersed in a KCl-LiCl eutectic constant temperature bath. The percent of absorption of the $SO_2$ by the melt as it bubbled through decreased from 100% to 98.4% after the flow rate had been increased to 14 ml./min. and 65% of the carbonate had been converted to sulfite. Thus, a KCl-LiCl melt containing less than 15 mole percent carbonate removed more than 99% of the $SO_2$ gas bubbled through it; more than 98% of the $SO_2$ gas was picked up in a melt containing only about 5 mole percent carbonate. The freezing point of the final lithium-potassium salt mixture containing approximately 85, 10, and 5 mole percent chloride, sulfite, and carbonate, respectively, was 325° C. compared with the 350–375° C. range of the starting composition. These results are indicative that melts containing as little as 2 mole percent carbonate would remove more than 90% of the $SO_2$ content of gases bubbled through them. Absorption temperature was 400° C.

EXAMPLE 3

Conversion of alkali metal sulfite

An alkali metal sulfite-carbonate melt was prepared by bubbling $SO_2$ gas through a ternary alkali metal carbonate melt of eutectic composition at a temperature of 450° C. The melt contained 13.9 wt. percent $M_2SO_3$ and 81.8 wt. percent $M_2CO_3$, where M denotes a ternary mixture of Li, Na, K. The melt was contacted with an approximately equimolar mixture of hydrogen and carbon monoxide gases at a temperature between 450 and 600° C. in a reaction vessel using stainless steel wire mesh packing in order to increase the melt surface area to provide greater melt-to-gas contact. The feed gas and off gas were monitored continuously using gas chromatography, and the melt was analyzed by a gas chromatographic technique. Analysis of the melt showed that all of the alkali metal sulfite had been converted. However, because competing side reactions were not controlled in this experiment, most of the conversion was to alkali metal sulfate.

To minimize the occurrence of side reactions, a reductant gas mixture simulating a producer gas in composition was prepared in the reaction vessel in situ, using as the initial feed gas an equimolar mixture of hydrogen and carbon dioxide. The resultant reductant feed gas, which was bubbled through the sulfite-containing carbonate melt, consisted of a mixture of $CO_2$, CO, $H_2$, and $H_2O$. The reaction was carried out at a temperature of 500° C. Analysis of the sulfite-carbonate melt showed that the $M_2SO_3$ content had been reduced from 13.9 wt. percent to about 1.5 wt. percent, with the off-gas mixture containing 4–9 wt. percent $H_2S$, the balance of the gas mixture containing 1–9 wt. percent CO, 40–60 wt. percent $H_2$, and 25–45 wt. percent $CO_2$.

The present process for removing sulfur oxides from flue gas is advantageous compared with wet processes using aqueous solutions or slurries in that it operates above the acid dewpoint of the flue gas (about 150° C.) and thereby avoids corrosion of heat exchangers by condensation of sulfuric acid. Further, the flue gas is not cooled down significantly during the removal of $SO_2$, enabling use of the hot purified gases in air and water preheaters, thereby improving the energy efficiency of the power plant. The present process is advantageous compared with other known dry processes in that the rate of the absorption reaction is more rapid because of the higher reactivity of, and better mass transfer in, the molten salt. By decreasing the required contact time in the reactors, the use of relatively small absorbers is feasible. The use of absorbers of much smaller size and relatively simple design results in significant savings in capital equipment requirements and in lower operating costs.

Further, in comparison with an alkalized alumina process, wherein all the adsorbed $SO_2$ is converted to sulfate by oxidation, probably catalyzed by the alumina, in the present molten carbonate process such an oxidation of the alkali metal sulfites is substantially avoided by removing potentially catalyzing fly ash particles from the flue gas prior to its entering the absorbers. This reduces the amount of the $CO$-$H_2$ gas mixture required for regeneration by about 25 percent. Since the cost of the gas mixture represents a very large fraction of the operating cost, such a saving is advantageous for the present process compared with the alkalized alumina process.

The present process has been illustrated with respect to the removal of $SO_2$ gas. However, the presence in the flue gas of $SO_3$, which is ordinarily but a minor fraction of the sulfur oxide content, does not interfere with the operation of the process. Thus, any $SO_3$ gas initially present is converted to alkali metal sulfate and fed to the regenerator along with the sulfite-carbonate mixture. During the regeneration step, the sulfate will be reduced in a similar manner corresponding to the reduction of sulfite.

It will, of course, be realized that many variations in reaction conditions may be used in the practice of this invention, depending in part upon the particular sulfur oxide content of the flue gas to be desulfurized, as well as the hydrocarbon or fossil fuel serving as the source of combustion gas. The term "hydrocarbon or fossil fuel" broadly includes carbonaecous fuels such as coal, oil-shale, petroleum products, natural gas, and associated waste products uch a acid sludges and tars.

While certain exemplary reactions have been described for the absorption and regeneration steps, it has been found, particularly with respect to the regeneration stage, that the actual mechanism of reaction is a highly complex one and several competing reactions may occur simultaneously. Therefore, to optimize the absorption and regeneration steps, varying reaction temperatures and pressure may be employed, as well as the use of catalysts and means for providing greater surface contact between the regenerant gas and the melt. Also, there may be employed a batch process or a continuous process, preferably the latter, with the usual provision for recycle of various unreacted or partially reacted mixture components. Further, even where the desired reactions do not go to completion and products are also present produced by competing or undesired side reactions, the unreacted or undesired products may be recycled in the process without substantial interference with the basic absorption and regeneration stages. Thus, while the examples illustrating this invention have been described with respect to specific concentrations, times, temperatures, and other reaction conditions, the invention may be otherwise practiced, as will be readily apparent to those skilled in this art. Accordingly, this invention is not to be limited by the illustrative and specific embodiments thereof, but its scope should be determined in accordance with the claims thereof.

We claim:

1. The process of removing a sulfur oxide impurity from a combustion gas which comprises contacting the combustion gas at a temperature of at least 350° C. with a molten salt mixture containing alkali metal carbonates as active absorbent for said sulfur oxide impurity.

2. The process of claim 1 wherein the melting temperature of said salt mixture is between 350 and 450° C., and said active absorbent consists of a ternary mixture of the carbonates of lithium, sodium, and potassium.

3. The process according to claim 2 wherein said absorbent ternary mixture consists essentially of, in mole percent, 45±5 lithium carbonate, 30±5 sodium carbonate, and 25±5 potassium carbonate.

4. The process according to claim 1 wherein said molten salt mixture consists essentially of, in mole percent, 15–60 $K^+$, 40–85 $Li^+$, and 0–20 $Na^+$ as cations and 10–98 $Cl^-$ and 2–90 $CO_3^=$ as anions.

5. The process of removing sulfur dioxide from hot combustion gas produced by burning a sulfur-containing hydrocarbon fuel which comprises contacting the sulfur dioxide-containing combustion gas at a temperature of at least 350° C. with an initial molten salt mixture containing alkali metal carbonates as active absorbent for said sulfur dioxide to convert it to the sulfites of said alkali metals, and reacting said alkali metal sulfites as a molten salt at a temperature of at least 400° C. with a gas mixture containing as active regenerant a gas composition selected from the class consisting of hydrogen and carbon monoxide, hydrogen and carbon dioxide, and hydrogen, carbon monoxide and carbon dioxide to form hydrogen sulfide gas as a recoverable product and regenerate the alkali metal carbonates for recirculation in the process.

6. The process according to claim 5 wherein said initial salt mixture is molten at a temperature between 350 and 450° C. and the absorbent thereof for sulfur dioxide is a ternary mixture consisting essentially of, in mole percent, 45±5 lithium carbonate, 30±5 sodium carbonate, and 25±5 potassium carbonate, the gas flow rate and amount of alkali metal carbonate in contact therewith being coordinated to provide about 10–30 mole percent alkali metal sulfite content in the resultant molten salt, and said sulfite-containing molten salt is reacted with the regenerate gas mixture at a temperature between 400 and 650° C.

7. The process according to claim 6 where the sulfite-containing molten salt is reacted with the regenerant gas mixture at a temperature between 500 and 600° C.

References Cited

A.P.C. application, May 13, 1941, Ser. No. 393,528, published July 13, 1943 (abandoned).

Bienstock et al.: Bureau of Mines Report of Investigations Number 5735, U.S. Dept. of The Interior, 1961.

OSCAR R. VERTIZ, *Primary Examiner.*

G. O. PETERS, *Assistant Examiner.*

U.S. Cl. X.R.

23—129, 181, 225